United States Patent
George et al.

(10) Patent No.: US 10,691,671 B2
(45) Date of Patent: Jun. 23, 2020

(54) USING PERSISTENT MEMORY TO ENABLE CONSISTENT DATA FOR BATCH PROCESSING AND STREAMING PROCESSING

(71) Applicant: Cisco Technology, Inc., San Jose, CA (US)

(72) Inventors: Johnu George, San Jose, CA (US); Amit Kumar Saha, Bangalore (IN); Debojyoti Dutta, Santa Clara, CA (US); Madhu S. Kumar, San Mateo, CA (US); Ralf Rantzau, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 197 days.

(21) Appl. No.: 15/850,168

(22) Filed: Dec. 21, 2017

(65) Prior Publication Data

US 2019/0197146 A1    Jun. 27, 2019

(51) Int. Cl.
| | | |
|---|---|---|
| *G06F 17/00* | (2019.01) | |
| *G06F 16/23* | (2019.01) | |
| *G06F 3/06* | (2006.01) | |
| *G06F 11/10* | (2006.01) | |
| *G06F 16/245* | (2019.01) | |
| *G06F 16/248* | (2019.01) | |
| *G06F 16/2455* | (2019.01) | |

(52) U.S. Cl.
CPC .......... *G06F 16/2365* (2019.01); *G06F 3/065* (2013.01); *G06F 3/0619* (2013.01); *G06F 3/0685* (2013.01); *G06F 11/1076* (2013.01); *G06F 16/245* (2019.01); *G06F 16/248* (2019.01); *G06F 16/24568* (2019.01)

(58) Field of Classification Search
CPC .. G06F 16/2365; G06F 16/245; G06F 16/248; G06F 16/24568
USPC .................................................. 707/600–899
See application file for complete search history.

(56) References Cited

U.S. PATENT DOCUMENTS

| | | |
|---|---|---|
| 6,691,101 B2 | 2/2004 | MacNicol et al. |
| 7,480,672 B2 | 1/2009 | Hahn et al. |
| 8,086,755 B2 | 12/2011 | Duffy, IV et al. |
| 8,713,405 B2 | 4/2014 | Healey, Jr. et al. |
| 8,990,335 B2 | 3/2015 | Fauser et al. |

(Continued)

OTHER PUBLICATIONS

Astakhov et al., "Lambda Architecture for Batch and RealTime Processing on AWS with Spark Streaming and Spark SQL," Amazon Web Services (AWS), May 2015, pp. 1-12.

*Primary Examiner* — Isaac M Woo
(74) *Attorney, Agent, or Firm* — Polsinelli PC

(57) ABSTRACT

Systems, methods, and computer-readable media are provided for consistent data to be used for streaming and batch processing. The system includes one or more devices; a processor coupled to the one or more devices; and a non-volatile memory coupled to the processor and the one or more devices, wherein the non-volatile memory stores instructions that are configured to cause the processor to perform operations including receiving data from the one or more devices; validating the data to yield validated data; storing the validated data in a database on the non-volatile memory, the validated data being used for streaming processing and batch processing; and sending the validated data to a remote disk for batch processing.

20 Claims, 8 Drawing Sheets

(56) References Cited

U.S. PATENT DOCUMENTS

| | | |
|---|---|---|
| 9,003,159 B2 | 4/2015 | Deshkar et al. |
| 9,229,810 B2 | 1/2016 | He et al. |
| 9,244,761 B2 | 1/2016 | Yekhanin et al. |
| 9,244,776 B2 | 1/2016 | Koza et al. |
| 9,361,192 B2 | 6/2016 | Smith et al. |
| 9,374,270 B2 | 6/2016 | Nakil et al. |
| 9,479,556 B2 | 10/2016 | Voss et al. |
| 9,483,337 B2 | 11/2016 | Gladwin et al. |
| 9,558,078 B2 | 1/2017 | Farlee et al. |
| 9,613,078 B2 | 4/2017 | Vermeulen et al. |
| 2002/0103815 A1 | 8/2002 | Duvillier et al. |
| 2003/0174725 A1 | 9/2003 | Shankar |
| 2007/0300236 A1* | 12/2007 | Hing ............... G06Q 10/10 719/315 |
| 2015/0142733 A1 | 5/2015 | Shadmon |
| 2015/0222444 A1 | 8/2015 | Sarkar |
| 2015/0302058 A1 | 10/2015 | Li et al. |
| 2016/0119159 A1 | 4/2016 | Zhao et al. |
| 2016/0335361 A1 | 11/2016 | Teodorescu et al. |
| 2017/0053132 A1 | 2/2017 | Resch |

* cited by examiner

USING PERSISTENT MEMORY TO ENABLE CONSISTENT DATA FOR BATCH PROCESSING AND STREAMING PROCESSING

TECHNICAL FIELD

The present technology pertains to data storage and in particular to providing a persistent memory for providing consistent data for streaming and batch processing.

BACKGROUND

In a database system that supports both streaming and batch processing of data (e.g., real-time display of collected/received information such as stocks as well as historical view of the same information collected over a period of time), query results of a streaming processing and batch processing can be inconsistent. The reason for this inconsistency is that two separate data paths exist for streaming processing and batch processing due to the requirement of faster access to the incoming data for streaming processing while such requirement is less stringent for batch processing of the incoming data.

In this system, there is no guarantee that the incoming data that is used for streaming processing along the streaming data path would be the same as the incoming data that is used for batch processing along the batch data path. This is due to the fact that the data for batch processing is written to a database. This writing of the data to the database may fail due to a number of reasons (e.g., due to redundancy check failure performed on the incoming data). Therefore, the data that is stored in the database and ultimately used for batch processing will be different from the data used for streaming processing. Improvements are needed to ensure consistency between the data used for streaming processing and the data used for batch processing.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
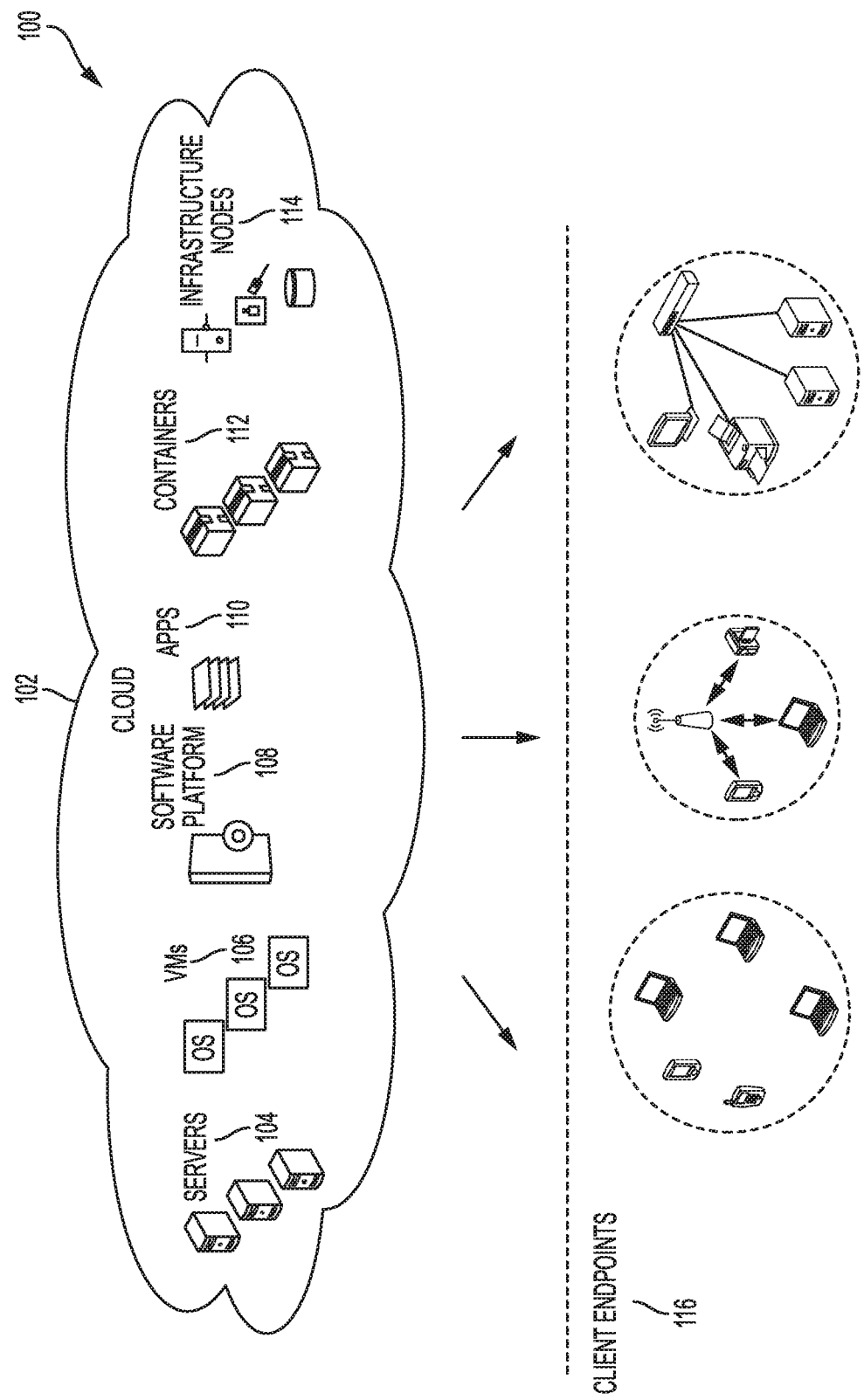
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A system includes one or more devices; a processor coupled to the one or more devices; and a non-volatile memory coupled to the processor and the one or more devices, wherein the non-volatile memory stores instructions that are configured to cause the processor to perform operations including receiving data from the one or more devices; validating the data to yield validated data; storing the validated data in a database on the non-volatile memory, the validated data being used for streaming processing and batch processing; and sending the validated data to a remote disk for batch processing.

A device includes a memory having computer-readable instructions stored therein; and one or more processors coupled to the memory and configured to execute the computer-readable instructions to perform functions including receiving data from one or more sensors; validating the data to yield validated data; storing the validated data in on a non-volatile memory associated with the device, the validated data being used for streaming processing and batch processing; and sending the validated data to a remote disk for batch processing.

A method includes receiving data from one or more sensors; validating the data to yield validated data; storing the validated data in a database of a non-volatile memory, the validated data being used for streaming processing and batch processing; and sending the validated data to a remote disk for batch processing.

DESCRIPTION

The disclosed technology addresses the need in the art for consistent data to be used for streaming and batch processing. The present technology involves system, methods, and computer-readable media for storing incoming data in an intermediary non-volatile memory, which would in turn be used for streaming processing and storage on a disk for a subsequent batch processing at a given point in the future.

A description of network environments and architectures for network data access and services, as illustrated in FIGS. 1A, 1B, 2A, and 2B, is first disclosed herein. A discussion of systems and methods for resuming transactions in data storage systems using client tags, as shown in FIGS. 3, 4, 5, and 6, will then follow. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
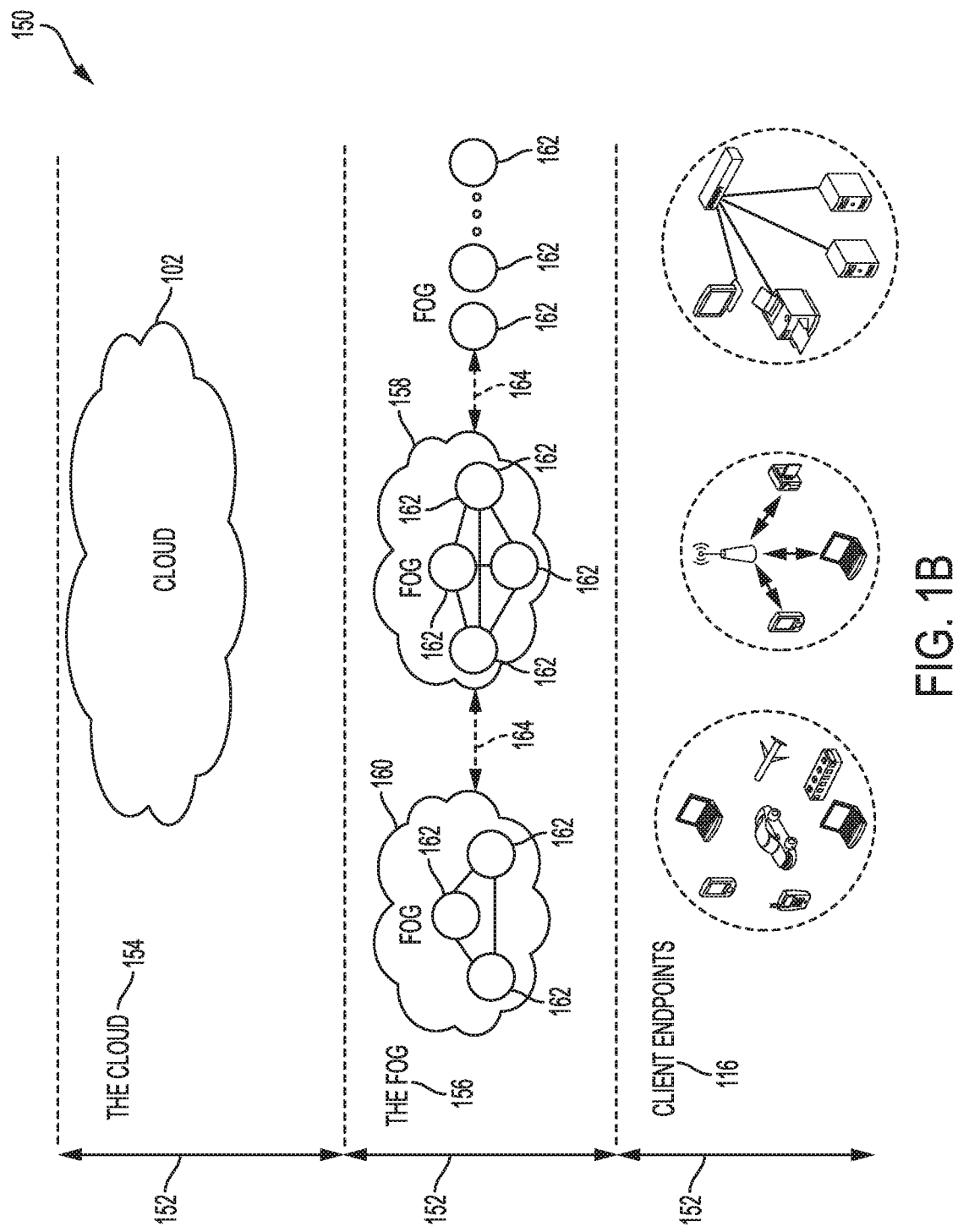
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158 and 160 can be local or regional clouds or networks. For example, the fog instances 158 and 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
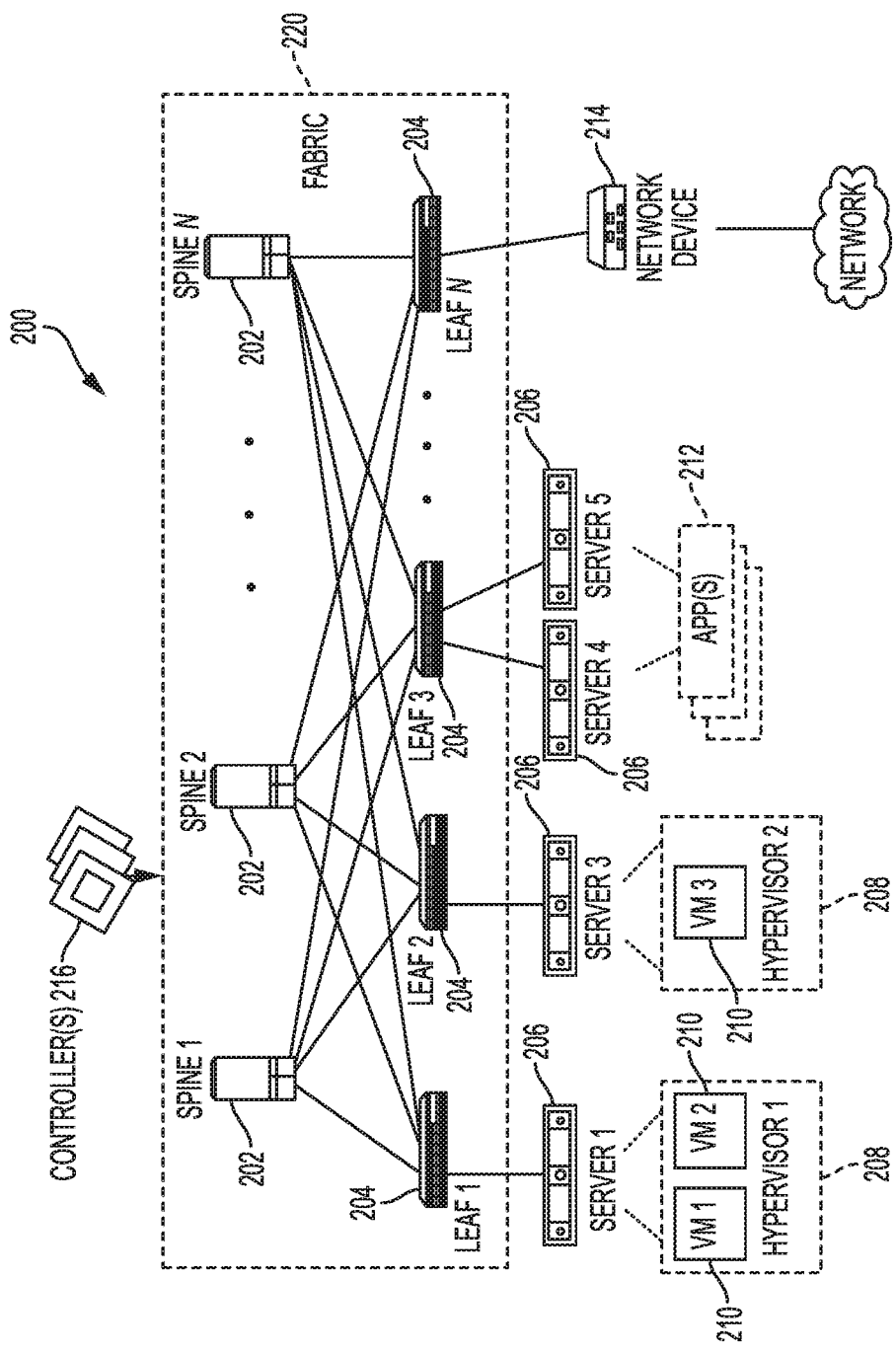
FIG. 2A illustrates a diagram of an example Network Environment.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
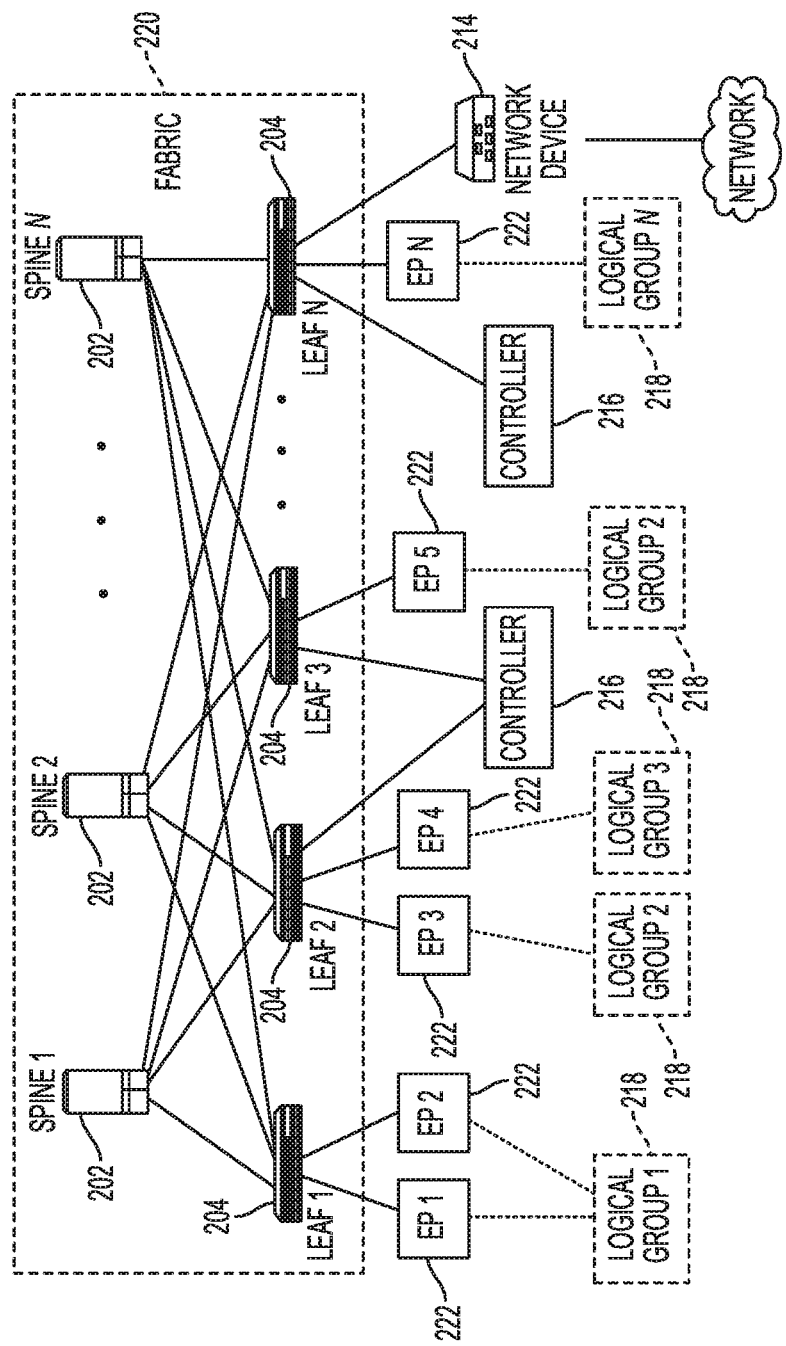
FIG. 2B illustrates another example of a Network Environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

The computing architectures shown in FIGS. 1A and 1B and the network environments shown in FIGS. 2A and 2B can be used to implement, at least in part, a data storage system, e.g. a database. A data storage system, as discussed herein, can be a distributed data storage system. A distributed data storage system can include clusters of nodes, otherwise referred to as distributed storage clusters. A distributed data storage system can be implemented as a distributed database. For example, a distributed data storage system can be implemented as a non-relational database that stores and accesses data as key-value pairs. Additionally, a distributed data storage system can be implemented across peer network data stores. For example, a distributed storage system can include peers acting as nodes within a distributed storage cluster that are connected and form the distributed storage cluster through an applicable network environment, such as the networks shown in FIGS. 2A and 2B.

In traditional databases, database (disk) writes are supported in parallel with real-time data streaming. These traditional databases have two separate pipelines, which can be referred to as the streaming data pipeline and the batch data pipeline. Incoming data is fed through the streaming dada pipeline for streaming processing while the same is also fed through the batch data pipeline to be stored (written) onto a disk. The reason for these separate pipelines is that due to the latency requirement of real-time data for streaming processing, a system cannot wait for the incoming data to be stored/written onto the disk prior to streaming processing because writing data to a disk is a time consuming event.

At the same time, while a copy of the incoming data is fed through the streaming data pipeline for streaming processing, there is no guarantee that the same data is correctly written onto the disk for batch processing. There can be a number of reasons for the data not being written to the database including redundancy check failure, power loss, etc. This presents problems because the underlying data used for streaming processing is not the same as the underlying data used for batch processing.

As will be described herein, one or more non-volatile memories (NVM) are provided as an intermediary storage for the incoming data. Such NVMs have relatively fast process capabilities for validating and storing the data thereon, which would be consistent with the time constraints of data availability for streaming processing. The data written to the one or more NVMs is then utilized for both streaming and batch processing thus ensuring consistency between underlying data used in both processes.

Figure 3:
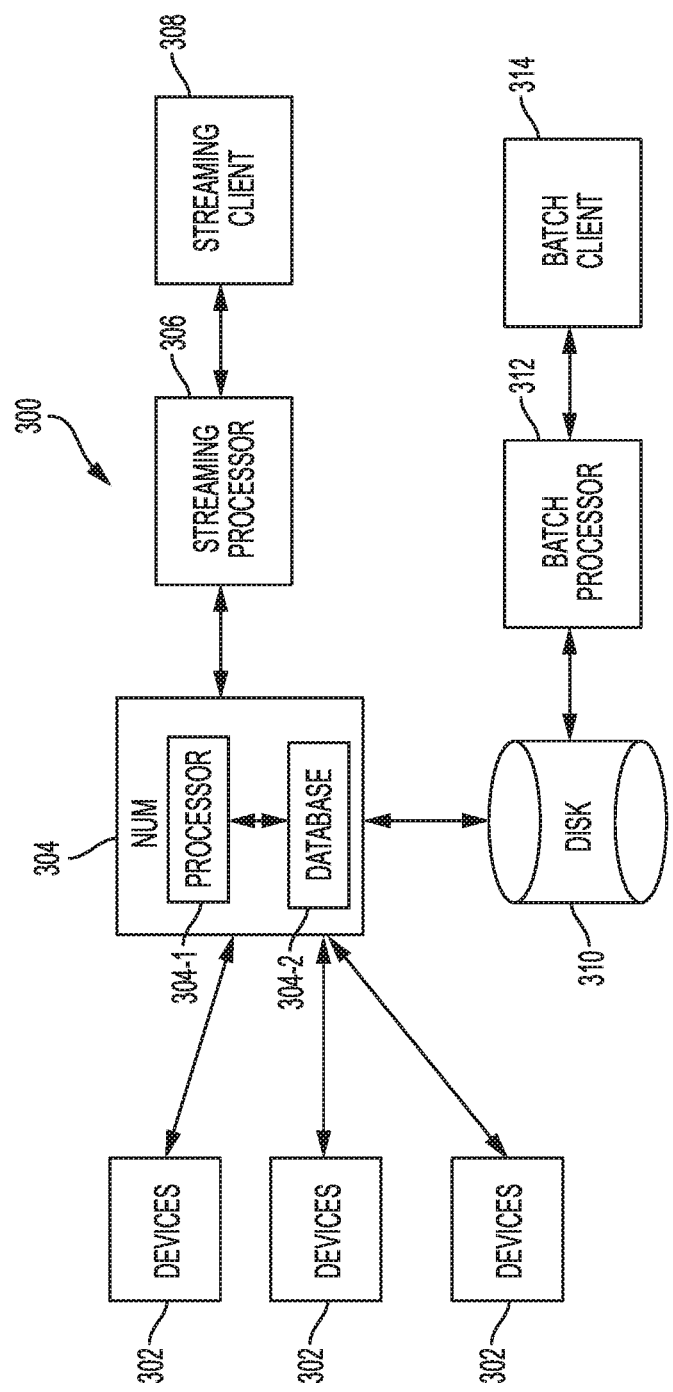
FIG. 3 depicts a diagram of a storage environment configured to provide consistency between data used for streaming processing and batch processing.

FIG. 3 depicts a diagram of a storage environment (storage system or simply system) 300 configured to provide consistency between data used for streaming processing and batch processing. Storage environment 300 includes one or more devices 302, a non-volatile memory (NVM) device 304, a streaming processor 306, a streaming client 308 associated with streaming processor 306, a disk 310, a batch processor 312 and a batch client 314 associated with batch processor 312.

One more devices 302 can be any type of known or to be developed device, sensor, processor, etc., that can collect data or information (e.g., real-time data or information) for analysis. For example, one or more devices 302 can be sensors installed throughout a power grid, on an oil field, in a wind farm, etc. In another example, one or more devices 302 can be one or more processors monitoring incoming and outgoing data such as stock market data or can be routers installed throughout a network, monitoring various parameters associated with incoming and outgoing network traffic. One or more devices 302 can be any one of client devices 116 of FIG. 1A. While FIG. 3 illustrates three devices 302, inventive concepts are not limited thereto and any number of devices 302 can be used to collect underlying data or information.

NVM device 304 can have a processor 304-1 and a database 304-2. In one example, incoming data from one or more devices 302 is received at NVM device 304. The incoming data can be processed by processor 304-1 for validation and storage in database 304-2, as will be described below. Database 304-2 can be any type of known or to be developed non-volatile memory (persistent memory) for storing (e.g., temporary storing) incoming data.

In one example, database 304-2 has a limited storage capacity, which once reached, the existing data thereon should be sent to disk 310 for storage, as will discussed below.

In one example, due to the non-volatile nature of database 304-2, in case of a loss of power, data stored in database 304-2 are not lost and can be retrieved upon restoring of power to NVM device 304.

In one example, NVM device 304 is located in close proximity to one or more devices 302 (e.g., in the same geographical location or on the site of the examples oil field, wind farm, power grid, computers of stock exchange markets, etc. described above). In another example, NVM device 304 can be located on the cloud and remotely from the one or more devices 302.

Streaming processor 306 can be any type of known or to be developed processor that can implement an algorithm for streaming processing of incoming data stored in database 304-2. For example, in the context of the oil field example above, streaming processor 306 can implement an algorithm for counting, in real time, a number of oil pressure readings received from one or more devices 302 along a vertical oil pipe.

In one example, streaming processor 306 is remotely located relative to NVM device 304. For example, streaming processor 306 can be implemented via any one of servers 104, VMs 106, containers 112 on cloud 102 of FIG. 1A.

Streaming client 308 can be any one or more of client endpoints 116 requesting a streaming processing of incoming data stored in database 304-2. In another example, streaming client 308 can be one or more applications (e.g., APPS 110 shown in FIG. 1A) that uses an outcome of the streaming process of incoming data stored in database 304-2.

Disk 310 can any type of database or memory for storing incoming data for a subsequent access by a batch processor, as will be described below. In one example, disk 310 is located remotely relative to NVM device 304. For example, disk 310 can be on cloud 102 implemented on one or more of servers 104, VMs 106, infrastructure nodes 114, etc.

Batch processor 312 can be any type of known or to be developed processor that can implement an algorithm for batch processing of data stored on disk 310. For example, in the context of the oil field example above, batch processor 312 can implement an algorithm for determining an average (e.g., hourly, daily, weekly, etc.) pressure along a vertical oil pipe based on incoming pressure readings received from one or more devices 302 and subsequently stored on disk 310.

In one example, batch processor 312 is remotely located relative to NVM device 304 and/or disk 310. For example, batch processor 312 can be implemented via any one of servers 104, VMs 106, and/or containers 112 on cloud 102 of FIG. 1A. In one example, streaming processor 306 and batch processor 312 can be the same (e.g., a single processor implementing a streaming algorithm and a batch algorithm).

Batch client 314 can be any one or more of client endpoints 116 requesting a batch processing of incoming data stored on disk 310. In another example, batch client 314 can be one or more applications (e.g., APPS 110 shown in FIG. 1A) that uses an outcome of the streaming process of incoming data stored in database 304-2.

In one example, streaming client 308 and batch client 314 can be the same.

Figure 4:
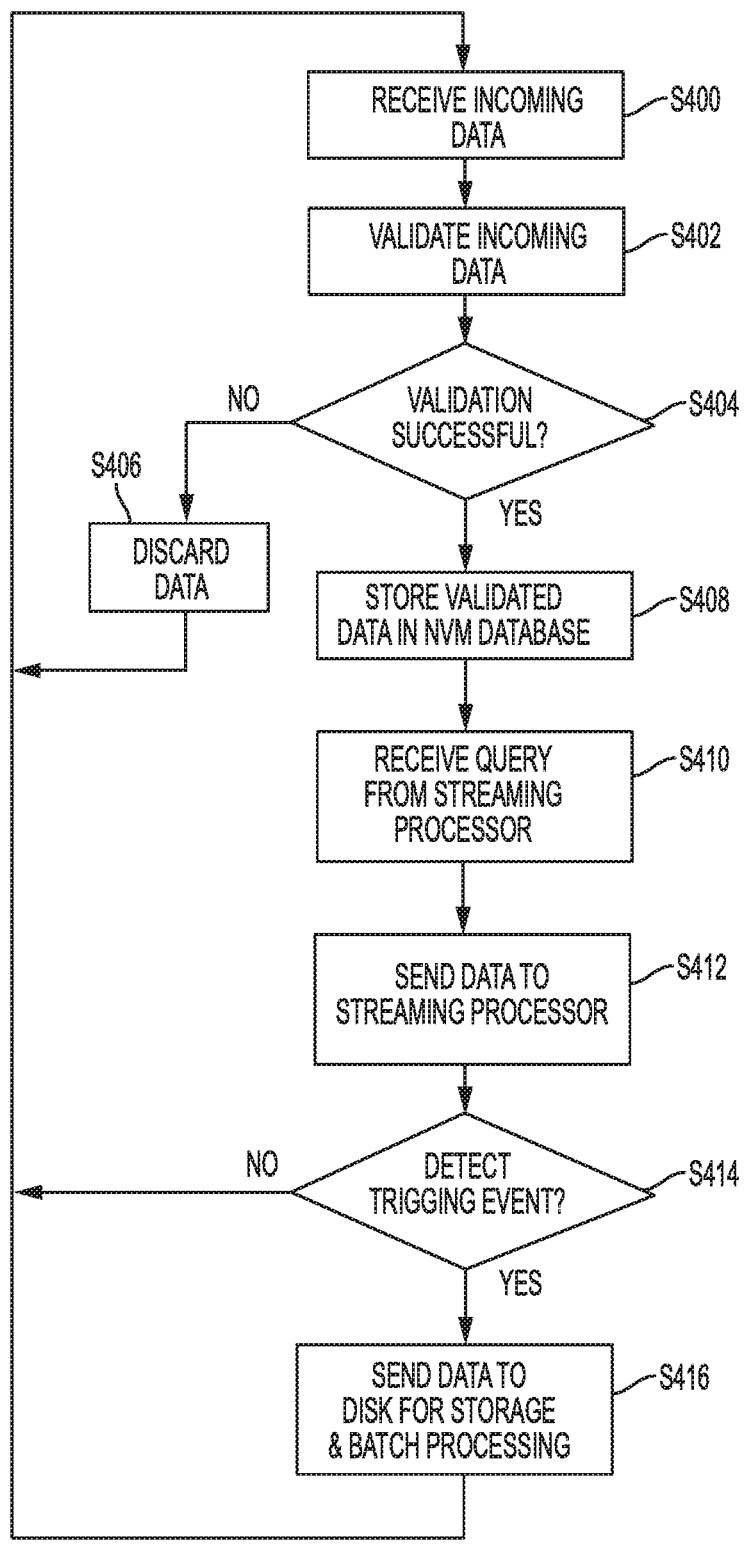
FIG. 4 is a method implemented by storage environment.

FIG. 4 is a method implemented by storage environment 300. FIG. 4 will be described from the perspective of NVM device 304 and more specifically processor 304-1 of NVM device 304. It can be appreciated that processor 304-1 is capable of executing computer-readable instruction stored on one or more associated memories (e.g., database 304-2), which would transform processor 304-1 into a special purpose processor for performing the functions described herein.

At S400, NVM device 304 receives incoming data from one or more devices 302. Incoming data can also be referred to as sensor data while one or more devices 302 can one or more sensors 302.

At S402, NVM device 304 validates the incoming data. In one example, NVM device 304 can validate the incoming data by performing any known or to be developed method for data failure check, a data redundancy check such as a cyclic redundancy check (CRC), etc.

In one example, NVM device 304 performs the validation of S402 as soon as new incoming data is received. In another example, NVM device 304 performs the validation of S402 every predetermined period of time (e.g., every 1 second, 5 seconds, etc.). The predetermined period of time is a configurable parameter that can be set based on empirical studies.

At S404, NVM device 304 determines if incoming data is successfully validated at S402. If at S404, NVM device 304 determines that the incoming data is not successfully validated, then at S406, NVM device 304 discards the incoming data and the process reverts back to S400.

However, if at S404, NVM device 304 determines that incoming data is successfully validated at S402, then at S408 the validated data is stored in database 304-2 of NVM 304.

At S410, NVM device 304 receives a request (query) from streaming processor 306 that is communicatively connected (coupled) to NVM 304 to retrieve validated data stored in database 304-2 for streaming processing by streaming processor 306. Streaming processor 306 can send the query to NVM device 304 on a continuous basis.

Thereafter, at S412, NVM device 304 sends the requested data from database 304-2 to streaming processor 306 via any known or to be developed wired and/or wireless communication protocol. As in the example provided above, the streaming processor 306 can implement a streaming function (e.g., counting the number of pressure readings along an oil pipe) on the data received from NVM device 304 and present a result thereof to streaming client (e.g., one of client endpoints 116).

In the alternative and due to the nature of streaming processing of data, instead of receiving a query from the streaming processor at S410, NVM device 304 can initiate transmission or sending of validated data to streaming processor 306 as soon as the incoming data is validated at S404. In this case, S412 is no longer needed.

At S414, NVM device 304 determines if a triggering event for sending the validated data stored in database 304-2 is detected. In one example, the triggering event can be an expiration of a predetermined period of time, which can have a configurable duration set based on experiments and/or empirical studies. In another example, the triggering event can be a threshold amount of data stored in database 304-2. For example, depending on a storage capacity of database 304-2 (e.g., 1 GB), the threshold can be set to 750 MB.

If no triggering event is detected at S414, the process reverts back to S400 and S400 to S414 is repeated.

Upon detecting a triggering event at S414, at S416, NVM device 304 sends the validated that stored in database 304-2 to disk 310 to be written thereon. For example, once 750 MB of validated data is stored in database 304-2, the NVM device 304 can initiate a transfer of the data stored in database 304-2 to disk 310.

Thereafter, the process reverts back to S400 and S400 to S416 is repeated.

As indicated above, data stored on disk 310 can be subsequently accessed (queried) by batch processor 312 (which may or may not be the same as streaming processor 306) for batch processing.

The above examples provide a database system that not only supports both streaming and batch processing of data, it also ensures that through the use of an intermediary NVM device such as NVM device 304, the underlying data that is used for both streaming and batch processing are the same, which would in turn provide a more reliable outcome of the batch and streaming processing.

Figure 5:
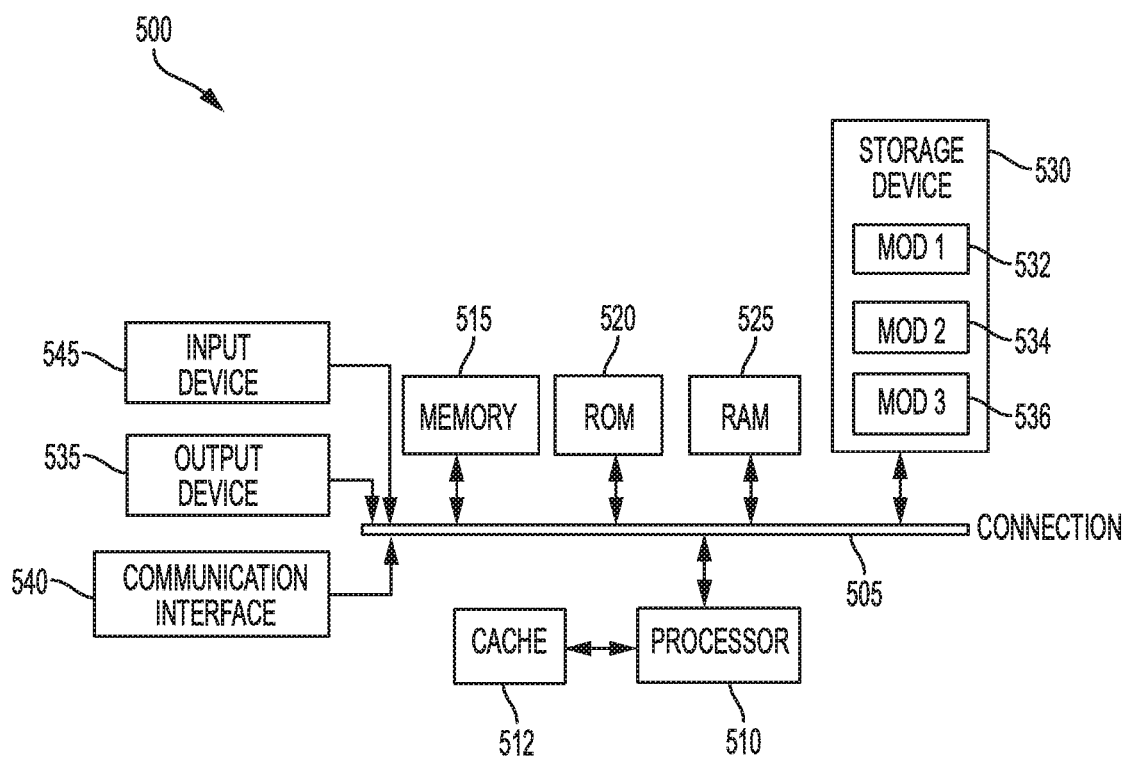
FIG. 5 illustrates an example computing system.
Figure 6:
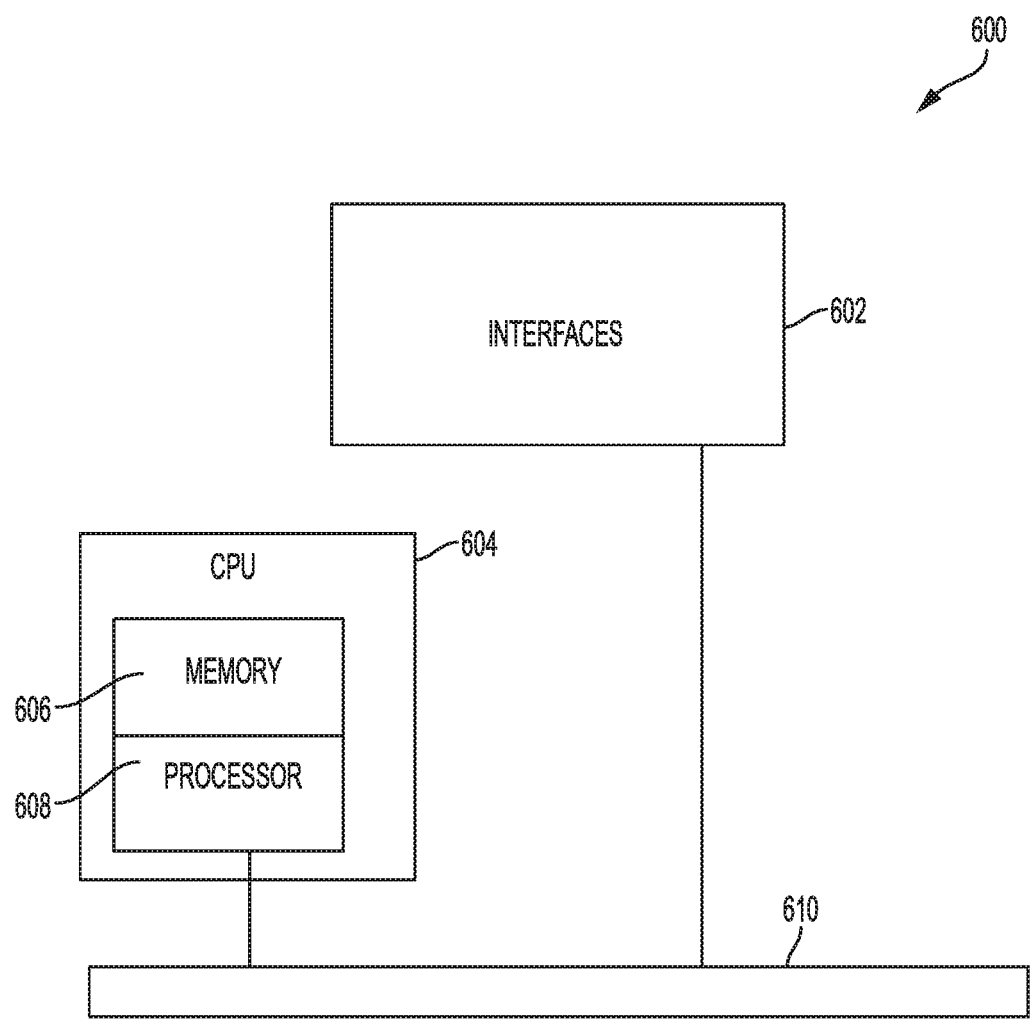
FIG. 6 illustrates an example network device.

The disclosure now turns to FIGS. 5 and 6, which illustrate example network devices and computing devices, such as switches, routers, load balancers, client devices, and so forth.

FIG. 5 illustrates a computing system architecture 500 wherein the components of the system are in electrical communication with each other using a connection 505, such as a bus. Exemplary system 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A system comprising:
one or more devices;
a processor coupled to the one or more devices; and
a non-volatile memory coupled to the processor and the one or more devices, wherein the non-volatile memory stores instructions that are configured to cause the processor to perform operations comprising:
receiving data from the one or more devices;
validating the data to yield validated data;
storing the validated data in a database on the non-volatile memory, the validated data being used for streaming processing and batch processing;
sending the validated data to a streaming processor that uses a streaming function to present a result of implementing the streaming function in real-time; and
sending the validated data to a remote disk to cause a batch processor to process the validated data and other validated data in the database obtained over a period of time.

2. The system of claim 1, wherein the streaming processor is communicatively coupled to the processor, the streaming processor executing computer-readable instructions to perform operations comprising:
querying the database of the non-volatile memory for the validated data stored therein;
implementing the streaming function on the validated data received from the non-volatile memory; and
presenting the result of implementing the streaming function on the validated data.

3. The system of claim 1, wherein the non-volatile memory is further configured to send the validated data to the remote disk to be stored therein upon triggering of an event.

4. The system of claim 3, wherein the triggering event is a passage of the period of time or when a target amount of validated data is stored in the database of the non-volatile memory.

5. The system of claim 1, wherein the one or more devices are configured to monitor and collect data in real time.

6. The system of claim 1, wherein the non-volatile memory is configured to validate the data by performing a data failure check on the data received from the one or more devices.

7. The system of claim 1, wherein the non-volatile memory is configured to validate the data by performing a data redundancy check on the data received from the one or more devices.

8. The system of claim 1, wherein the non-volatile memory is in the same geographical location as the one or more devices.

9. A device comprising:
a memory having computer-readable instructions stored therein; and
one or more processors coupled to the memory and configured to execute the computer-readable instructions to perform functions including:
receiving data from one or more sensors;
validating the data to yield validated data;
storing the validated data in on a non-volatile memory associated with the device, the validated data being used for streaming processing and batch processing;
sending the validated data to a streaming processor that uses a streaming function to present a result of implementing the streaming function in real-time; and sending the validated data to a remote disk to cause a batch processor to process the validated data and other validated data in the database obtained over a period of time.

10. The device of claim 9, wherein the device is communicatively coupled to the one or more sensors.

11. The device of claim 9, wherein
the validated data is sent to the streaming process in response to receiving a query from the streaming processor for the validated data stored on the non-volatile memory.

12. The device of claim 9, wherein the device is further configured to send the validated data to the remote disk to be stored therein upon triggering of an event.

13. The device of claim 12, wherein the triggering event is a passage of the period of time or when a target amount of validated data is stored in the database of the device.

14. The device of claim 9, wherein the one or more processors are configured execute the computer-readable instructions to validate the data by performing a data failure check on the data received from the one or more sensors.

15. The device of claim 9, wherein the one or more processors are configured to execute the computer-readable instructions to validate the data by performing a data redundancy check on the data received from the one or more sensors.

16. The device of claim 9, wherein the device is in the same geographical location as the one or more sensors.

17. A method comprising:
receiving data from one or more sensors;
validating the data to yield validated data;
storing the validated data in a database of a non-volatile memory, the validated data being used for streaming processing and batch processing; and
sending the validated data to a streaming processor that uses a streaming function to present a result of implementing the streaming function in real-time; and
sending the validated data to a remote disk to cause a batch processor to process the validated data and other validated data in the database obtained over a period of time.

18. The method of claim 17,
wherein the validated data is sent to the streaming processor in response to receiving a query from the streaming processor for the validated data stored in the database.

19. The method of claim 17, further comprising sending the validated data to the remote disk to be stored therein upon triggering of an event, the triggering event being a passage of the period of time or when a target amount of validated data is stored in the database of the non-volatile memory.

20. The method of claim 17, wherein validating the data is based on performing one of a data failure check or a data redundancy check on the data received from the one or more sensors.

* * * * *